A. J. JOHNSON.
Belt-Fastener.

No. 207,038.　　　Patented Aug. 13, 1878.

UNITED STATES PATENT OFFICE.

ANDREW J. JOHNSON, OF CLEVELAND, ASSIGNOR TO HARLOW S. JOHNSON, EMILY B. JOHNSON, AND WILLIAM M. CHAPMAN, OF RAVENNA, OHIO.

IMPROVEMENT IN BELT-FASTENERS.

Specification forming part of Letters Patent No. 207,038, dated August 13, 1878; application filed May 20, 1878.

*To all whom it may concern:*

Be it known that I, ANDREW J. JOHNSON, of Cleveland, Ohio, have invented a new and useful Improvement in Belt-Fasteners, which improvement is fully set forth in the following specification.

The drawings hereto annexed, consisting of one sheet, form a part of this specification.

The object of my invention is to shape the slots through the links which connect the belts so that the upper sides of the slots will operate as cams to press the rods which fasten the links together firmly against the belts; also, to prevent the rods from turning or moving endwise by bending their ends in opposite directions after they have been placed in the links.

Figure 1:
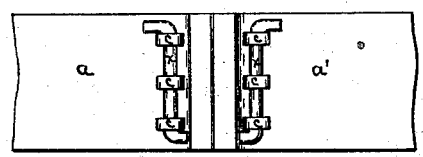
Figure 2:

Figure 1 is a top view of my device in place in the belts. Fig. 2 represents a longitudinal section.

The ends of links $c\ c\ c$ are inserted through holes in belts $a\ a'$. The rods $x\ x$, with their ends unbent, are then inserted through slots $s\ s\ s$ in the links, after which the ends of the rods may be bent in opposite directions, as shown in Fig. 1. The upper sides of slots $s\ s\ s$ are inclined outward toward the line of draft of the belts. When draft is applied to the belts the inclined upper sides of slots $s\ s\ s$, by comprossion, force rods $x\ x$ into, or partially into, the belts. The rods $x\ x$ should not extend entirely across the belt.

When the ends of each rod are bent in opposite directions, the belt being slightly curved at that place, the draft causes the ends of the rod to sink into the belt, so that the belt, when in motion, may be handled without injury to the operator.

If desired, the ends of rods $x\ x$ may be left unbent, the pressure upon them in slots $s\ s\ s$ being sufficient to partially sink them into the belts, and thus prevent them from sliding out of the links. Any suitable number of links may be used.

I am aware that links provided with openings for the insertion of cross-rods to fasten belts are not new; but

I claim as my invention—

1. The link $c$, provided with slots $s$, having inclined upper sides, to operate as cams in forcing the cross-rods $x$ into the belts, substantially as described.

2. The rod $x$, having its ends bent in opposite or nearly opposite directions, in combination with links for connecting the ends of belts, substantially as described.

ANDREW J. JOHNSON.

Witnesses:
 CHARLES O. EVARTS,
 FELIX NICOLS.